US010995972B2

(12) United States Patent
Buscheck (10) Patent No.: US 10,995,972 B2
(45) Date of Patent: May 4, 2021

(54) MULTI-FLUID RENEWABLE GEO-ENERGY SYSTEMS AND METHODS

(71) Applicant: Lawrence Livermore National Security, LLC, Livermore, CA (US)

(72) Inventor: Thomas A. Buscheck, Pleasanton, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 516 days.

(21) Appl. No.: 15/642,045

(22) Filed: Jul. 5, 2017

(65) Prior Publication Data
US 2017/0299226 A1    Oct. 19, 2017

Related U.S. Application Data

(63) Continuation-in-part of application No. 14/310,070, filed on Jun. 20, 2014, now Pat. No. 9,739,509.

(51) Int. Cl.
*F24T 10/20* (2018.01)
*F01K 25/10* (2006.01)
(Continued)

(52) U.S. Cl.
CPC ............... *F24T 10/20* (2018.05); *F01K 7/16* (2013.01); *F01K 25/103* (2013.01); *F02C 1/05* (2013.01);
(Continued)

(58) Field of Classification Search
CPC .................................. F24J 3/085; F03G 7/04
(Continued)

(56) References Cited

U.S. PATENT DOCUMENTS 8,316,955 B2    11/2012    Saar et al.
8,833,475 B2    9/2014    Saar et al.
(Continued)

FOREIGN PATENT DOCUMENTS

AU    2010223059 A1    9/2011
CA    2753393 A1    9/2010
(Continued)

OTHER PUBLICATIONS

Buscheck et al. (Analysis of Operational Strategies for Utilizing 002 for Geothermal Energy Production—Thirty-Eighth Workshop on Geothermal Reservoir Engineering, Stanford University—SGP-TR-198) Feb. 11,2013 (Year: 2013).*
(Continued)

*Primary Examiner* — George S Gray
(74) *Attorney, Agent, or Firm* — Harness, Dickey & Pierce, P.L.C.

(57) ABSTRACT

A geo-energy production system and method extracts thermal energy from a reservoir formation, and stores either thermal waste heat or excess heat in a storage zone of the reservoir formation. A compressed fluid injection injects an unheated, compressed working fluid into the storage zone. A fluid injection well injects a working fluid laden with thermal waste heat or excess heat into the storage zone. The storage zone is located below a caprock layer and above a native brine zone of the reservoir formation and is partially circumscribed by a hot brine storage zone. The compressed working fluid assists with a withdrawal of pressurized brine residing below and/or to the sides of the storage zone. A compressed $CO_2$, $N_2$, or air production well helps to remove compressed working fluid from the storage zone for use in power production.

9 Claims, 9 Drawing Sheets

(51) Int. Cl.
    *F03G 7/04*   (2006.01)
    *F02C 1/05*   (2006.01)
    *F01K 7/16*   (2006.01)
    *F28D 20/00*  (2006.01)
    *F24T 10/00*      (2018.01)

(52) U.S. Cl.
    CPC ........... *F03G 7/04* (2013.01); *F28D 20/0052* (2013.01); *F24T 2010/56* (2018.05); *Y02E 10/10* (2013.01); *Y02E 60/14* (2013.01); *Y02E 70/30* (2013.01)

(58) Field of Classification Search
    USPC .......................................... 60/641.2
    See application file for complete search history.

(56) References Cited

U.S. PATENT DOCUMENTS

| | | | |
|---|---|---|---|
| 9,739,509 | B2 | 8/2017 | Buscheck |
| 2006/0048770 | A1 | 3/2006 | Meksvanh et al. |
| 2010/0071366 | A1 | 3/2010 | Klemencic |
| 2011/0126539 | A1 | 6/2011 | Ramaswamy et al. |
| 2011/0137480 | A1 | 6/2011 | Sampson et al. |
| 2012/0038174 | A1 | 2/2012 | Bryant et al. |
| 2013/0043678 | A1* | 2/2013 | Saar .................. F02C 1/005 290/2 |
| 2013/0056171 | A1* | 3/2013 | Klemencic ............ F03G 7/04 165/45 |
| 2013/0062890 | A1 | 3/2013 | Saar et al. |
| 2014/0130498 | A1 | 5/2014 | Randolph |
| 2015/0369521 | A1 | 12/2015 | Buscheck |

FOREIGN PATENT DOCUMENTS

| | | |
|---|---|---|
| EP | 2406562 A2 | 1/2012 |
| JP | 2008248837 A | 10/2008 |
| KR | 101683714 B1 | 12/2016 |

OTHER PUBLICATIONS

International Search Report and Written Opinion for corresponding International PCT Application No. PCT/US2018/040026 dated Oct. 31, 2018, 18 pp.

Buscheck et al. Analysis of Operational Strategies for Utilizing CO2 for Geothermal Energy Production—SGP-TR-198, Feb. 11, 2013, 14 pages.

* cited by examiner

MULTI-FLUID RENEWABLE GEO-ENERGY SYSTEMS AND METHODS

CROSS-REFERENCE TO RELATED APPLICATIONS

This application is a continuation-in-part of U.S. patent application Ser. No. 14/310,070 filed on Jun. 20, 2014. The entire disclosure of the above application is incorporated herein by reference.

STATEMENT OF GOVERNMENT RIGHTS

The United States Government has rights in this invention pursuant to Contract No. DE-AC52-07NA27344 between the U.S. Department of Energy and Lawrence Livermore National Security, LLC, for the operation of Lawrence Livermore National Laboratory.

FIELD

The present disclosure relates to multi-fluid, renewable geo-energy systems and methods, and more particularly to multi-fluid, geothermal and geo-energy systems and methods that employ one or more concentric rings of working fluid injection wells that at least partially circumscribe one or more production wells, and which employ a ring of brine production wells that at least partially circumscribe the working fluid injection wells, and which employ supplemental working fluids, in addition to native brine, and related methods to enhance the production of brine and supplemental fluid in a manner to increase the overall efficiency of a geothermal energy system, as well as systems and methods for synergistically harvesting, storing and dispatching renewable energy sources in renewable geo-energy systems to provide large-scale, diurnal-to-seasonal storage of both thermal and bulk energy and electrical-grid stabilizing, power-generation capacity.

BACKGROUND

The statements in this section merely provide background information related to the present disclosure and may not constitute prior art.

Climate change mitigation requires a range of measures to reduce carbon dioxide ($CO_2$) emissions to the atmosphere. Two of the most important measures include increasing reliance on technologies that generate electricity from renewable resources and reducing the $CO_2$, intensity of fossil energy use. Despite providing reliable and predictable power, geothermal resources are underutilized relative to their vast resource potential. Challenges that have heretofore limited geothermal deployment include (1) the cost and risk of prospecting and well drilling, (2) parasitic power cost of fluid recirculation, and (3) geographically limited range of geologic settings amenable to the current generation of hydrothermal geothermal power systems. Geologic $CO_2$ storage (GCS) has received considerable attention as a means of reducing the $CO_2$ intensity of fossil-energy systems. But the high cost of supplying $CO_2$ by capturing it from exhaust streams requires valuable uses for $CO_2$ to justify those costs.

Wind and solar are renewable energy sources with enormous resource potential. However, such energy sources are difficult to predict and are temporally variable, both diurnally and seasonally. Until major advances in both thermal energy storage (TES) and bulk energy storage (BES) technology are commercialized, wind and solar energy technologies will require back-up, load-following, and peaking power sources, which often emit a significant quantity of $CO_2$. The temporal nature of the major renewable power sources (primarily wind and solar, and in some instances, hydro) may also result in costly power curtailments to other low-$CO_2$ power sources (e.g., nuclear power plants). These drawbacks are setbacks in attempts to mitigate climate change. To effectively meet goals for reduced $CO_2$ emissions, integrating electricity generated from wind and solar resources into power grids requires that their diurnal and seasonal variability and unpredictability be addressed with minimal reliance on $CO_2$-intensive back-up and grid-stabilizing (e.g., load-following) power sources, and without displacing other low-$CO_2$ power sources.

Still further, there is continuing interest in maximizing the efficiency and utility of geo-thermal energy systems. In one sense, the Earth itself may be viewed as potentially forming an exceedingly large, ready-made energy recovery/storage device or reservoir.

SUMMARY

In one aspect the present disclosure relates to a geo-energy production system for extracting thermal energy from a reservoir formation, and storing thermal waste heat or excess heat in a storage zone of the reservoir formation. The system may comprise at least one compressed fluid injection well in communication with the storage zone for injecting an unheated, compressed working fluid into the storage zone, and at least one fluid injection well in communication with the storage zone for injecting a heated working fluid laden with thermal waste heat into the storage zone. The storage zone may be located below a caprock layer of the reservoir formation and above a zone of native brine within the reservoir formation. The storage zone may further be at least partially circumscribed by. a hot brine storage zone of the reservoir formation. The unheated, compressed working fluid further assists with a withdrawal of pressurized brine residing below and/or to the side of the storage zone. At least one compressed fluid energy storage production well may be in communication with the storage zone for removing the unheated, compressed working fluid from the storage zone for use in power production.

In another aspect the present disclosure relates to a method for geothermal energy storage using a geothermal reservoir formation, the geothermal reservoir formation including a storage reservoir of brine located below a caprock layer. The method may comprise performing a thermal recharge operation by which brine is heated and pressurized, and then injected through a hot brine/cold-supplemental working fluid injection well extending into the storage reservoir. The heated and pressurized brine increases a temperature of the storage reservoir to cause it to act as a high-grade geothermal resource. An unheated supplemental working fluid recharge operation may be performed during which a supplemental working fluid is compressed and then injected through the hot brine/cold-supplemental working fluid injection well into the storage reservoir. An energy discharge operation may be performed in which at least one of heated supplemental working fluid or a mixture of heated supplemental working fluid and brine is withdrawn through a hot brine/hot supplemental working fluid production well and fed into a fluid separator, an output of the fluid separator producing at least one of hot brine or hot supplemental working fluid.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
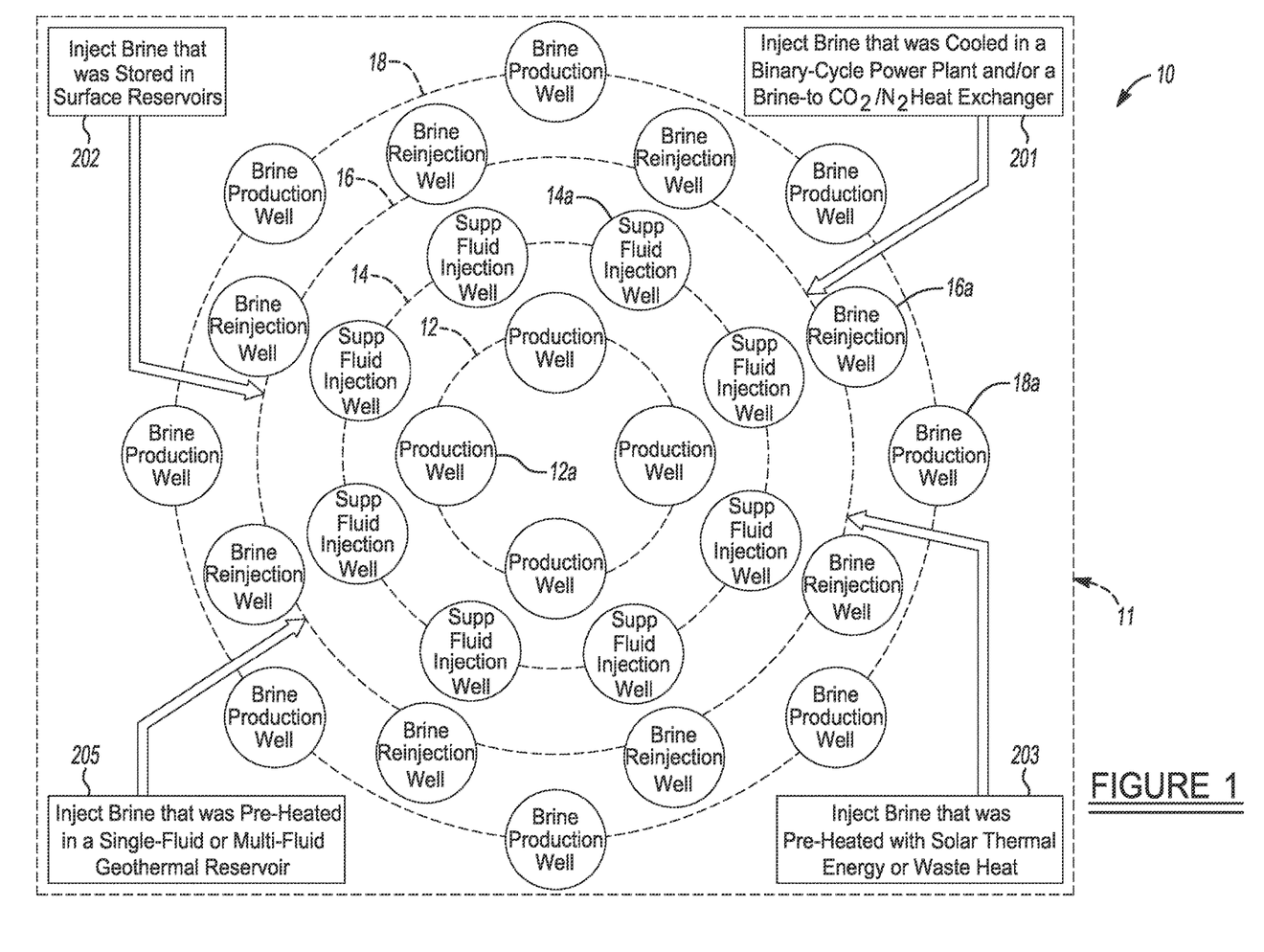
FIG. 1 is a high level plan view of one embodiment of a system in accordance with the present disclosure in which a plurality of rings of wells are used for forming a geothermal energy recovery and energy storage system.

Referring to FIG. 1, in one embodiment the present disclosure involves a geo-energy system 10 that may be used as (1) a geothermal energy system to recover geothermal energy, (2) a thermal energy storage system to store and dispatch thermal energy, using above-ground sources such as solar thermal energy, or (3) a "hybrid" system that combines geothermal energy recovery with thermal energy storage. The system 10 is located within a geothermal reservoir formation 11. If used for thermal energy storage, such as solar thermal energy storage, the system 10 may be located in a subsurface reservoir formation 11 that is not considered to be a geothermal resource. The system 10 may make use of both native brine and a supplemental working fluid to extract geothermal energy. The supplemental working fluids may include supercritical $CO_2$ and supercritical $N_2$. However, it is especially effectively deployed when $N_2$ is included as one of the constituents. Particular advantages of using $N_2$ are that it can be separated from air at low cost, compared to that of captured $CO_2$. Nitrogen is also non-corrosive and will not react with the reservoir formation 11. The addition of $N_2$ can improve the economics of $CO_2$-enabled geothermal energy production and mitigate operational issues associated with $CO_2$. If a two-stage, nitrogen-enriched combustion process is used; the resulting flue gas can have low enough concentrations of oxidants to be a suitable, low-cost source of $N_2$ and $CO_2$. The systems and methods of the present disclosure can also utilize conventional flue gas to extract geothermal energy and methane from deep, unmineable coal seams.

Figure 2:
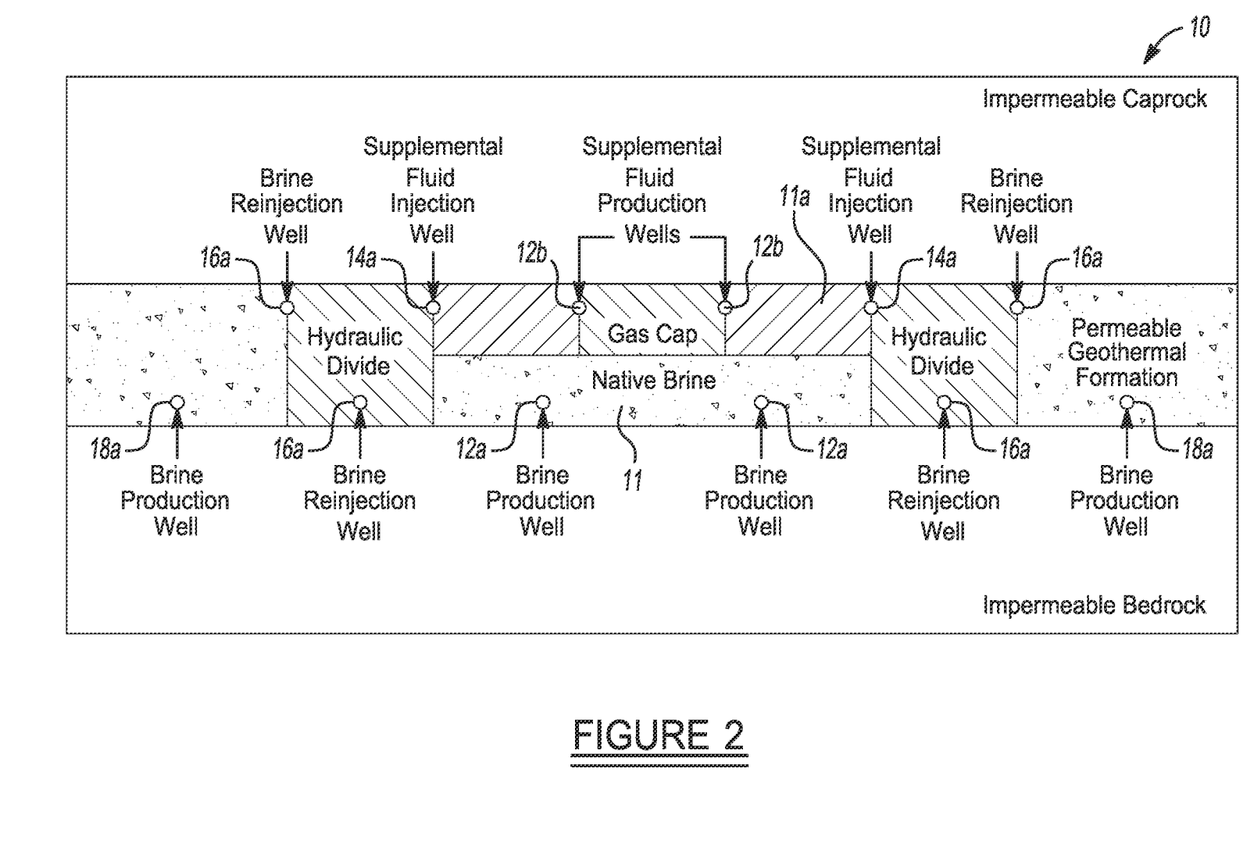
FIG. 2 is a high level side view of one example of how the wells shown in FIG. 1 may be configured at different depths, and also how horizontal wells within a given ring may also be configured at different depths to tailor the system to the specific reservoir formation at which the system is being employed.

In FIG. 1 the system 10 may be deployed with four rings of production and injection wells, which significantly enhances overall efficiency of the system 10. As shown in FIG. 2, the system 10 is deployed in a permeable geothermal reservoir formation 11 that is bounded above and below by an impermeable caprock and impermeable bedrock. The impermeable caprock is important because it confines the vertical migration of the buoyant supplemental fluids ($N_2$ and $CO_2$). The impermeable caprock and bedrock are important to system 10 because they help conserve pressure. An inner ring 12 consists of a plurality of production wells 12a for extracting native brine from the reservoir formation 11. A second ring 14 consists of a plurality of supplemental working fluid injection wells 14a for injecting a supplemental working fluid into the reservoir formation 11. More specifically, the second ring 14 of supplemental working fluid injection wells 14a may be used for injecting $N_2$ and/or $CO_2$ into the reservoir formation 11. A third ring 16 may consist of a plurality of brine re-injection wells 16a for re-injecting extracted native brine back into the reservoir formation 11. A fourth ring 18 of brine production wells 18a may be used to recover portions of the native brine re-injected via the third ring of re-injection wells 16a and to relieve overpressure in areas adjacent to the reservoir formation 11. The inner ring 12 of production wells 12a and the outer ring 18 of brine production wells 18a may be completed at various depths to provide better control of fluid and energy recovery for improved sweep efficiency, which reduces thermal drawdown and increases power generation and its sustainability. The rings of injection wells 14a and 16a may also be completed at multiple depths, as will be described in greater detail herein, to provide better control of fluid and energy recovery. It will be appreciated that a greater or lesser plurality of wells may be included in each of the rings 12-18 than what is shown in FIG. 1. Furthermore, while the wells 12a-18a are shown in FIG. 1 as being arranged generally concentrically, this is not absolutely critical to efficient operation of the system 10. However, the individual wells of the fourth ring of wells 18a are preferably arranged to at least partially circumscribe the third (re-injection) wells 16a, which are in turn preferably arranged to at least partially circumscribe the second (injection) wells 14a, which are in turn preferably arranged to at least partially circumscribe the production wells 12a.

Referring to FIGS. 1 and 2, the multi-ring approach of the system 10 can take advantage of the fact that horizontal well drilling technology allows for precise directional control of the well orientation; hence it is realistic to create precisely curved injection and production intervals. Another important reason for using a plurality of rings 12-18 is to conserve the pressure energy from the injection process and to minimize the loss of the supplemental working fluid. The four-ring configuration (or variations of that configuration) creates a hydraulic divide, which is a distinct region of overpressure as shown in FIG. 2. The four rings 12-18 facilitate a range of pressure management strategies to spread out reservoir overpressure and thereby limit its magnitude, to thus significantly reduce or eliminate the possibility of induced seismicity and leakage of the supplemental working fluid. The hydraulic divide (FIG. 2) that is created by the four-ring configuration of the system 10 shown in FIG. 1 also allows the production wells 12a and 18a to be segregated into two groups, with the inner ring 12 of wells 12a transitioning from brine to supplemental working fluid production, and the outer ring of wells 18a only producing brine. Segregation of the production wells 12a and 18a in this fashion can help simplify well-field operations.

With specific reference to FIG. 2, a high level side view illustrates that the wells within one or more of the rings 12-18 may be located at different depths in the reservoir formation 11. More specifically, the brine re-injection wells 16a may be located at different depths relative to the caprock and bedrock that confine the reservoir formation 11 from above and below. The benefits of the hydraulic divide are that it conserves pressure and supplemental working fluid and segregates the production wells into those that transition from brine to supplemental working fluid production and those that only produce brine. Another important benefit of this configuration is that the large volume of the reservoir formation inside the hydraulic divide can be used to store large quantities of energy. Accordingly, the hydraulic divide is analogous to how a dam functions in storing energy for hydroelectricity generation. A plurality of production wells 12a and 12b are also included for initially extracting native brine and eventually extracting the supplemental working fluid from a gas cap 11a overlying the native brine within the reservoir formation 11. Wells 12b are used for extracting supplementing working fluid ($N_2$ and/or $CO_2$) from the gas cap 11a. The gas cap gradually expands vertically downward with time, driving native brine to production wells 12a, using a process called gravity-drainage double-displacement.

The multiple, concentric-ring well design described above is well adapted to store pressure and supplemental fluid ($CO_2$ and/or $N_2$), much like how a hydroelectric dam stores potential energy. Stored pressure can generate large artesian flow rates, providing much better leveraging of well costs. Because fluid production is driven by stored pressure, it becomes possible to schedule production (and highly dispatchable power generation) to coincide when power demand is high or when there is a deficit of renewable energy on an electrical power grid that the system is in communication with. Reservoir analyses show that it does not require much supplemental fluid ($CO_2$ or $N_2$) injection to substantially enhance the rate of brine production and power generation. A significant benefit of $CO_2$ or $N_2$ injection is that it generates excess brine for re-injection through displacement; however, there is an additional, more subtle, and more profound benefit of this injection process. That benefit is in altering the pressure distribution within the reservoir. It has been determined that only a relatively small amount of $CO_2$ or $N_2$ is needed to create a "topographic high" in pressure (hydraulic divide in FIG. 1), providing the opportunity to inject pressurized brine in the third ring of brine re-injection wells (16a) that sit on top of the hydraulic divide "uphill" from the "downhill" outer brine production wells (18a).

It is also important to understand that the supplemental fluid used to generate the topographic high in pressure distribution does not need to be $CO_2$ or $N_2$; rather, it may be make-up brine extracted from a separate reservoir. Alternatively, the supplemental fluid may be make-up water from a separate source. In one example the make-up water may be effluent from a wastewater treatment plant. Make-up brine can be excess brine that is replaced by supplemental-fluid ($CO_2$ and/or $N_2$) injection in a multi-fluid geothermal reservoir or it can be brine extracted for the purpose of pressure management in a geological $CO_2$ storage (GCS) operation. Make-up brine can also be the effluent from a reverse osmosis (RO) desalination plant. Thus, the first family of embodiments of this disclosure replaces $CO_2$ and/or $N_2$ with brine or water as the supplemental fluid that is injected for the purpose of pressure augmentation.

Figure 3:
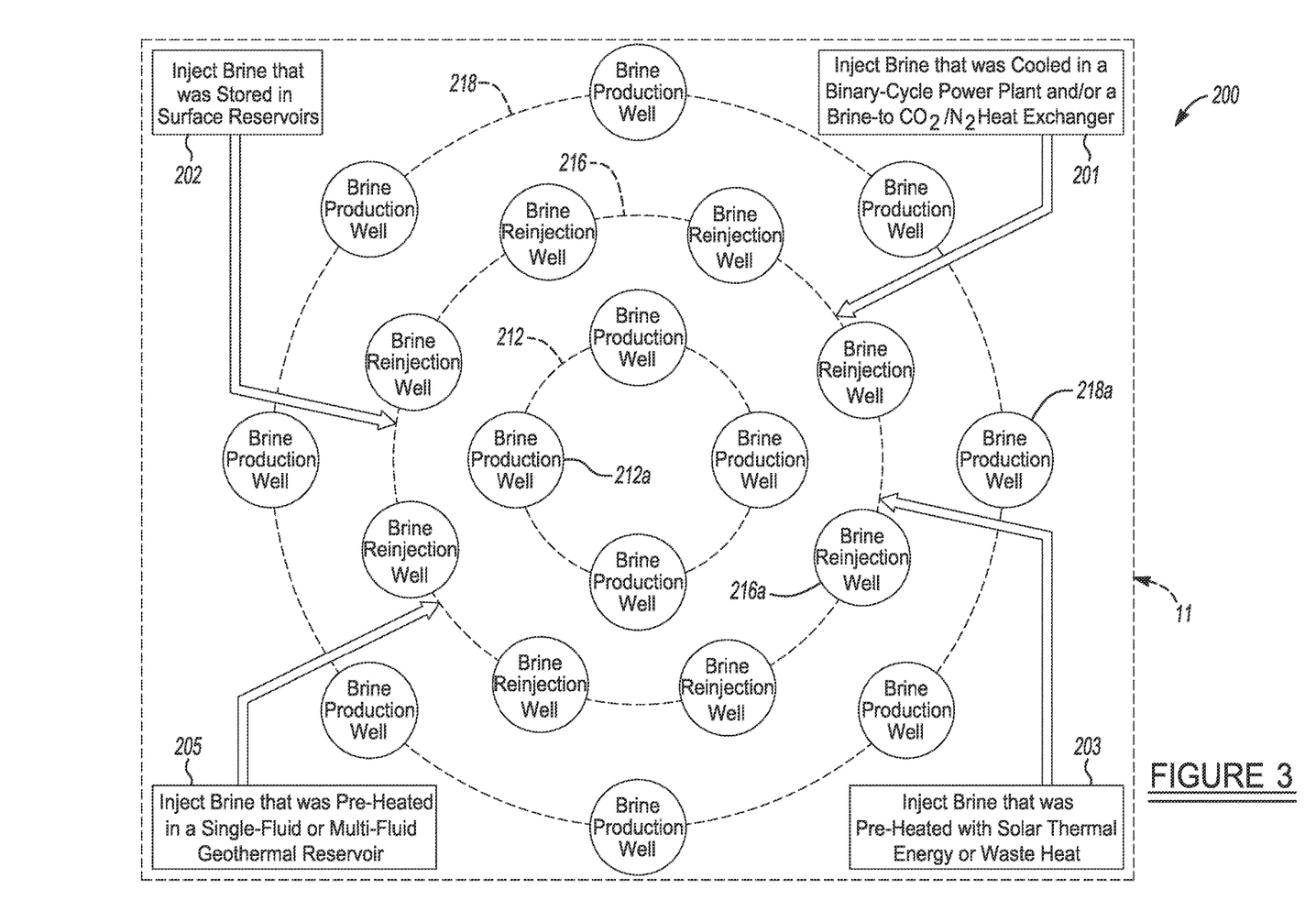
FIG. 3 is a high level plan view of a single-fluid geothermal/STES or CTES reservoir system, where STE stands for solar thermal energy storage and CTES stands for chilled thermal energy storage.
Figure 4:
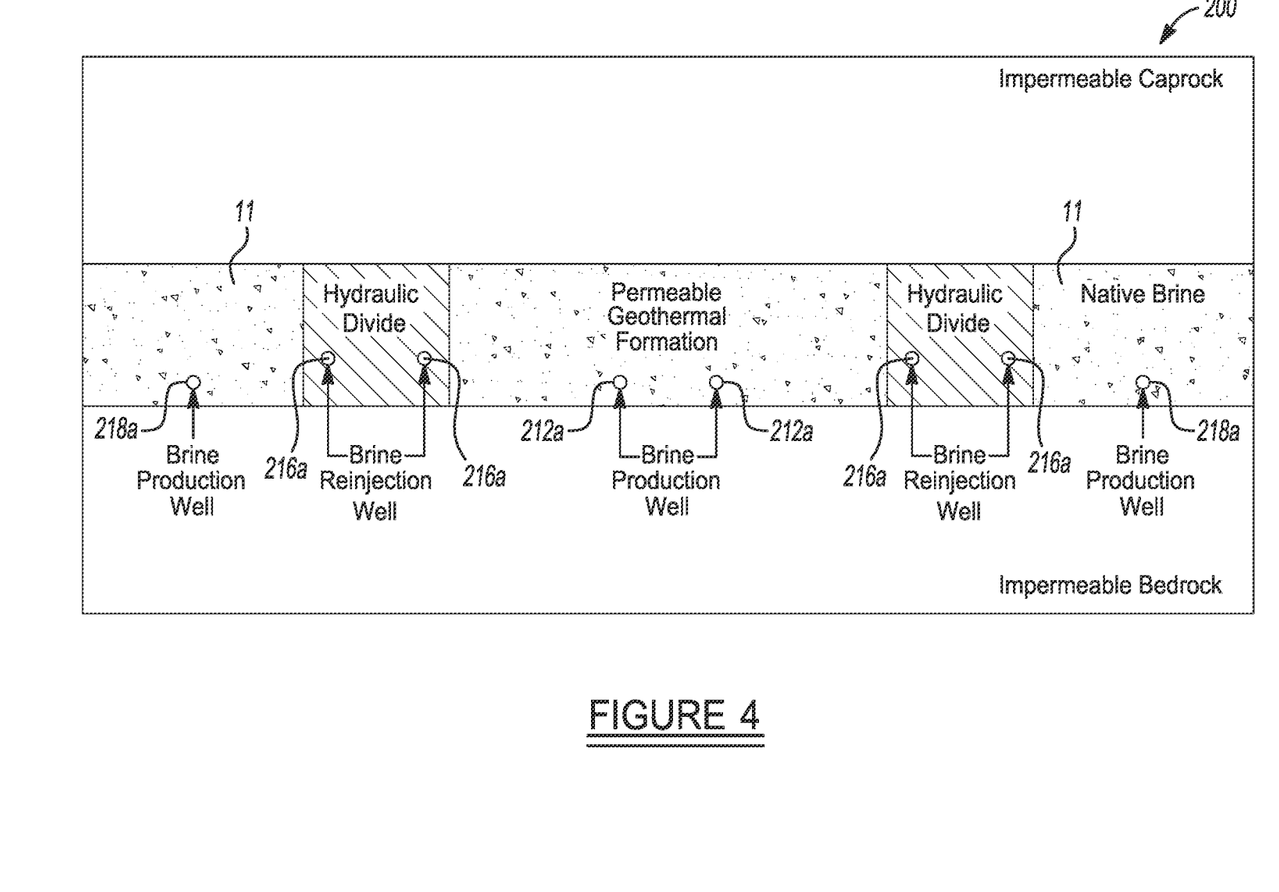
FIG. 4 is a high level side view of a single-fluid geothermal/STES or CTES reservoir system.

As shown in FIGS. 3 and 4, this approach may be implemented with a concentric multi-ring system 200 (FIG. 3) similar to that of FIG. 1. The system 200 of FIG. 3 makes use of preferably at least three concentric well rings: (1) an inner ring 212 of brine production wells 212a, (2) a middle ring 216 of brine reinjection wells 216a, and (3) an outer ring 218 of brine production wells 218a. For the three well-ring configuration, brine reinjected in the middle ring 216 of wells 216a is "uphill" from the "downhill" inner and outer brine production wells 212a and 218a. This pressure augmentation process can be thought of as the subsurface equivalent of "pumped-storage" hydroelectricity. Subsurface pumped storage can drive large brine production rates while generating highly dispatchable power. Furthermore, this can be accomplished without requiring submersible pumps to lift brine up through the production wells 212a and 218a. Large centralized pumps located on the surface are expected to be even more efficient than submersible pumps. Surface-based pumps will not be exposed to harsh conditions that often occur in brine production wells and would not require the maintenance that can disrupt brine production and power output of geothermal energy systems. Pumped storage is expected to be particularly valuable in hydrostatic reservoirs where temperatures are too hot (>200° C.) for submersible pumps to survive and operate. Where horizontal wells are used, pumped storage may drive flow rates much greater than the capacity of submersible pumps (typically 80 to 120 kg/sec), which would increase leveraging of well costs. This family of embodiments is significant because it enables heat to be extracted from a geothermal resource without the added complexity associated with introducing a working fluid with significantly different thermophysical properties and chemistry from those of native brine, such as would be the case with supercritical $CO_2$. Hence, this approach allows a geothermal system to rely on existing geothermal technology and methods, when such technology and methods are used in connection with the energy-efficient, concentric-ring well configuration shown in FIG. 3, and the possible use of horizontal wells.

Time-Shifting the Parasitic Loads of Brine Pumping, $N_2$ Separation, and $N_2$ Pumping for BES and Grid-Stabilizing Power Generation Capacity Another family of embodiments of the present disclosure enables subsurface pressure storage, which in turn enables bulk energy storage (BES) and a grid-stabilizing power generation capability, such as load following. A load-following power generation capability is becoming increasingly necessary with increasing penetration of intermittent renewables on power grids. For liquid-dominated geothermal reservoirs under hydrostatic pressure conditions, a significant fraction of gross power output is consumed with the parasitic load required to lift the brine up through the production wells 212a, which is typically achieved with submersible electrical pumps. Some additional parasitic load typically also results because of the overpressure required to overcome frictional losses in the brine re-injection wells 216a. Because the multiple concentric-ring well design of FIGS. 1, 2, 3 and 4 discussed herein store pressure much like a hydroelectric dam, the majority of the overall parasitic load is that associated with brine pumping, i.e., over pressurizing brine for re-injection into the brine re-injection wells (216a in FIGS. 3 and 4). The second largest parasitic load is that associated with separating $N_2$ from air and compressing $N_2$ for injection into supplemental fluid injection wells (214a in FIGS. 1 and 2). The parasitic load of brine pumping and/or $N_2$ separation and pumping can be time-shifted to coincide with periods when power supply exceeds power demand, such as what may occur when there is an excess supply of intermittent renewable power on the electrical power grid.

Figure 5:
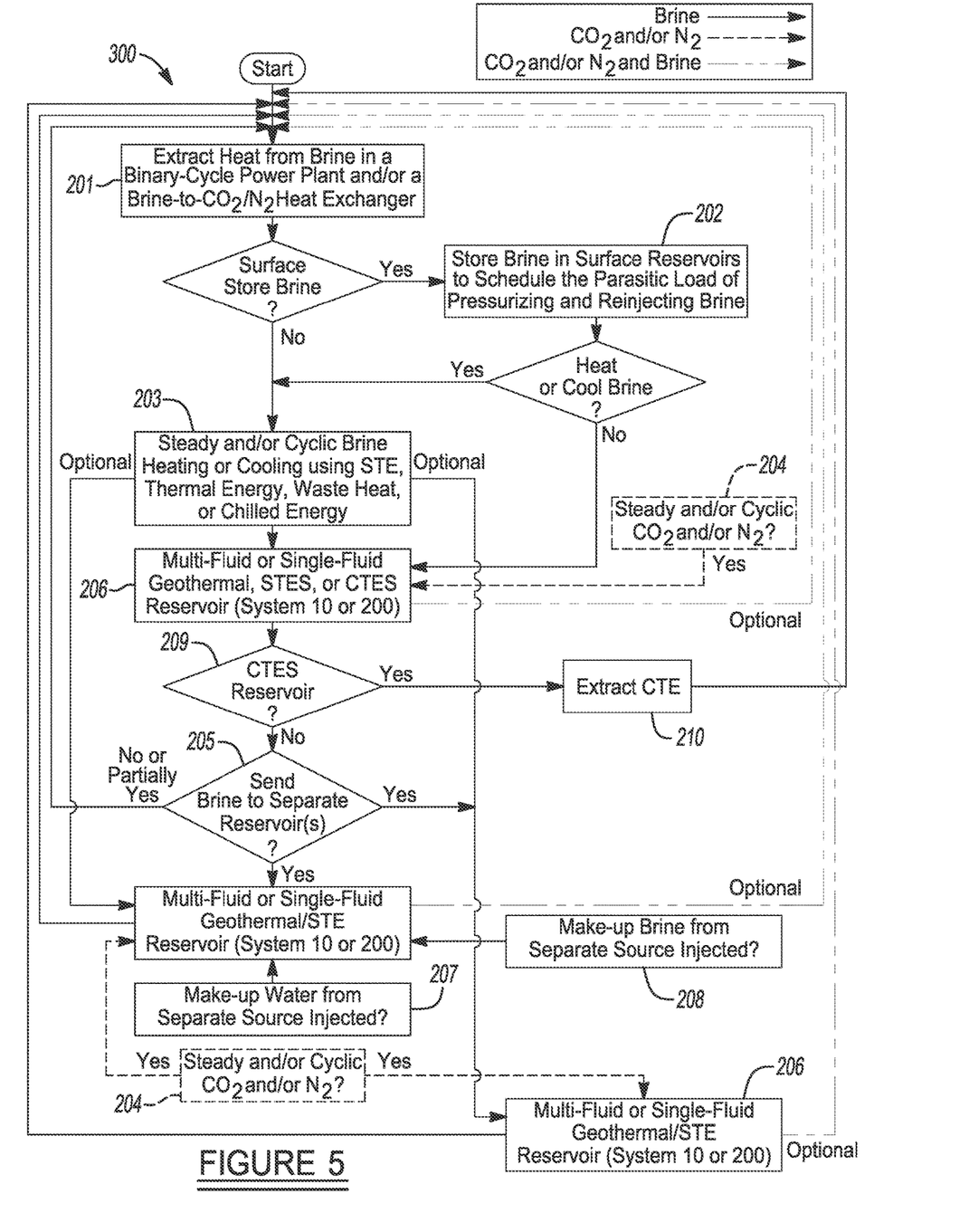
FIG. 5 is a high level flowchart illustrating a plurality of operations that may be implemented using the systems shown in FIGS. 1-4.

With further reference to FIGS. 1 and 3, parasitic-load time-shifting can be accomplished by temporarily storing brine in a surface reservoir (operation 202 in FIGS. 1 and 3), which is best done when power demand exceeds power supply on electricity grids. It should be noted that time-shifting the parasitic load of $N_2$ separation and pumping does not require the temporary storage of $N_2$ because $N_2$ can be readily separated from air. Time-shifting both of these parasitic loads allows the net power output to be close to gross power output during the time that the parasitic loads are not imposed, which is useful when power demand exceeds supply. Time-shifting the parasitic load of brine pressurization and injection to periods when power supply exceeds demand on electricity grids can be accomplished using a wide range of operational combinations (FIG. 5). One such example is to produce brine (operation 205 in FIGS. 1, 3, and 5) from a typically shallow reservoir and immediately pressurizing and reinjecting it into a separate (typically deeper and hotter reservoir) reservoir. Thus, operation 205 allows brine that has been pre-heated in the shallower reservoir to be injected into (and to improve heat recovery from) the deeper reservoir. This will be discussed further in connection with operation 205 in FIG. 5.

Parasitic-load time-shifting can provide the capacity to soak up excess power from electrical power grids during periods of over-generation. This can be very valuable where the penetration of photovoltaic (PV) power into grids is becoming high, such as in California. For example, from about 11 AM in the morning to about 2 PM in the afternoon, during the spring and fall when the air conditioning load is light and PV power supply is high, parasitic-load time-shifting may be used to soak up excess power from the electrical power grid. Where the penetration of wind power is high, parasitic-load time-shifting could soak up excess power at night (e.g., during a 3-to-4-hour window) when wind speeds are often high and power demand is low. Thus, as just one example, time-shifting the parasitic loads of brine pumping and of $N_2$ separation and pumping could be scheduled in a diurnal fashion, during roughly two 3-to-4-hour windows: one occurring at midday and the other at night.

Grid-stabilizing power generation capacity, such as load following and peaking power, is needed to compensate for constantly fluctuating imbalances between supply and demand on electrical power grids. The systems of the present disclosure can accomplish this important function in at least two fundamental ways: (1) adjusting gross power output and (2) adjusting net power output by time-shifting the parasitic load. The second approach can be fine-tuned by modulating how much of the parasitic load of brine pumping (and/or $N_2$ pumping) is imposed at any given time. Organic Rankine cycle (ORC) power turbines and/or direct $CO_2/N_2$ power turbines could be allowed to spin at full capacity, while adjusting the parasitic loads of brine and/or $N_2$ pumping to modulate the net power output of the geothermal plant, which could provide a very rapid and precise response to grid imbalances. In this fashion, the high capital investment in the power turbines could be fully and continuously utilized. BES and load following capacity could be achieved by oversizing the brine-pumping and $N_2$-pumping capacities so that a large fraction of the brine-pumping and/or $N_2$-pumping parasitic loads could be scheduled when it is most advantageous. The additional capital cost of oversizing the brine pumps and the $N_2$ separators and compressors would probably be much less than the capital cost of oversizing the power turbines, which would be necessary if gross power output was being adjusted to respond to imbalances between supply and demand on the grid. Hence, the likely preferred option would be to adjust net power output, rather than to adjust gross power output to provide grid-stabilizing (e.g., load-following and peaking) power generation capacity. This is quite different from conventional load-following and peaking power systems (e.g., gas turbines) where the power plant must function at much less than full capacity to provide the load-following ancillary service. If additional load-following ancillary service is required, the systems and methods disclosed herein can operate to adjust the gross output from the power turbines, which is accomplished by adjusting the rate of heat withdrawal from the geothermal reservoir; however, this may be the second option because it does not allow the most expensive components of the power system to continuously run at full capacity. Because brine production is driven by stored pressure, the systems and methods of the present disclosure can rapidly and precisely adjust the rate of heat withdrawal from the reservoir and gross power output for load following and peaking power.

Hybrid Geothermal/STE Storage and Power Systems

The third family of embodiments of the present disclosure involves thermal augmentation of brine at the ground surface utilizing solar thermal energy (STE) and/or waste heat to further improve upon the year-round dispatchability of one or more renewable energy sources. The availability of solar thermal energy (STE) varies in a highly seasonal and diurnal fashion, placing heavy demands on back-up and load-following power sources (which in turn often emit substantial quantities of $CO_2$). The embodiments of the present disclosure enable the storage of STE in a subsurface reservoir, whether or not that reservoir has temperatures hot enough to be considered an economically viable geothermal resource. The presently disclosed embodiments also enable using STE and/or waste heat to augment reservoir temperatures and thereby enhance the economic viability of a geothermal resource (203 in FIGS. 1, 3, and 5). Even if a relatively low-temperature heat source is used, such as waste heat, thermal augmentation of brine prior to reinjection can reduce the rate of thermal drawdown for a geothermal reservoir system. Thermal augmentation can also be selectively applied to brine that is injected into known "thief zones", which are zones of high permeability where injected fluids preferentially flow. Because the residence time of injected fluid is less in thief zones, there can be insufficient time for the injected fluid to be heated by the reservoir prior to arriving at the production wells. Thus, selectively heating brine that is injected into known thief zones, rather than heating brine that is injected into zones with longer residence time, can mitigate the negative impact of early breakthrough and rapid thermal drawdown. Thus, the embodiments and methods described herein can enhance the productivity of a geothermal resource by potentially extending its operating lifetime.

With the systems and method of the present disclosure, there are various options and combinations of options that can be implemented for the timing of thermal augmentation of brine (brine heating). Brine can be heated in a steady fashion, as may apply to the use of waste heat. Brine may be heated in a cyclic fashion, as would apply to the diurnal and seasonal availability of STE. Temporary storage of brine in surface reservoirs (operation 202 in FIGS. 1, 3, and 5) allows the brine to be available for thermal augmentation when STE or waste/excess heat is available. Brine heating can be conducted in a multi-stage fashion, by pre-heating brine with waste heat, followed by cyclic heating with STE.

In addition to enhancing the productivity of geothermal resources already having economically viable resource temperatures, the systems and methods of the present disclosure can utilize reservoirs with marginal or even sub-marginal resource temperatures for diurnal and seasonal storage of STE, thereby further enabling BES and load-following power generation. Combined with parasitic-load time-shifting, this approach can be scheduled to take excess power from the grid and store electricity and STE when supplies of photovoltaic (PV) power and concentrating solar power (CSP) are greatest. Because the availability of STE coincides when PV power and CSP supplies are greatest, the systems and methods of the present disclosure can synergistically take power from the grid when there is a surplus of solar power, such as from 11 AM to 2 PM during the spring and fall. This approach is unique by virtue of being the only solar-energy technology believed to exist which is designed to take power from, and deliver power to, the grid with exactly the opposite timing (both diurnally and seasonally) of all other existing solar-energy technologies. If deployed at a sufficiently large scale, the hybrid solar-geothermal approach which the present systems and methods enables could offset diurnal and seasonal variability of solar power being supplied to electricity grids. This in turn would reduce dependence on fossil-energy ($CO_2$-intensive) back-up and load-following power generation systems, while not displacing other low-$CO_2$ power sources, such as nuclear.

Integration of Multi-Fluid and Single-Fluid Geothermal/STES Reservoirs

The fourth family of embodiments enables multi-fluid geothermal/STES reservoirs (such as system 10 in FIG. 1) to be integrated with single-fluid (brine-only) geothermal/STES reservoir (system 200 in FIG. 3). This approach enables brine to be pre-heated in a relatively shallow reservoir with moderate temperatures prior to being injected into a hotter and deeper reservoir. Series looping of brine through two integrated (shallow and deep) reservoirs may be a more efficient power-conversion process than parallel looping of brine in two independent (shallow and deep) reservoirs. This approach also uses $CO_2$ as a working fluid where it is more advantageous (shallower reservoirs with lower temperatures), while using brine as a working fluid where it is more advantageous, such as with deeper/hotter reservoirs. This embodiment family can be combined with other embodiment families (e.g., parasitic-load time-shifting) to increase BES capacity. Another advantageous combination is to pre-heat $CO_2/N_2$ produced from a shallow multi-fluid geothermal reservoir with brine produced from a deeper/hotter reservoir, prior to sending the $CO_2/N_2$ through a direct turbine, as discussed below.

Multi-Fluid Power Conversion: Brine-to-$CO_2/N_2$ Heat Transfer in Surface-Located Heat Exchangers A fifth family of embodiments that may be implemented using the teachings of the present disclosure involves transferring heat from produced brine to produced $CO_2/N_2$ mixtures in a surface-located heat exchanger (201 of FIGS. 1, 3, and 5), thereby taking advantage of the greater power-conversion efficiency of direct $CO_2/N_2$ turbines compared to ORC binary-cycle power plants. This approach is significant because it can generate more power per unit heat extracted from the geothermal reservoir than would be possible for a single-fluid (brine-only) power-conversion process. The Joule-Thomson effect causes $CO_2$ to cool as it loses pressures flowing up the production well and expands. Note that a potential benefit of mixing $N_2$ with $CO_2$ is that $N_2$ will reduce the pressure loss up the borehole, resulting in greater wellhead pressure, which could increase power generated from produced $CO_2$. Because brine loses little temperature as it flows up the brine production well, when it originates from the same reservoir pressure and temperature conditions as did the $CO_2/N_2$, it will always be hotter than produced $CO_2/N_2$. Therefore, there will always be the opportunity for produced $CO_2/N_2$ to be pre-heated by produced brine in a surface heat exchanger prior to it being sent through a direct $CO_2/N_2$ turbine. An operational goal would be to balance the respective brine and $CO_2/N_2$ production rates so that most of the potentially available heat in the produced brine could be utilized to pre-heat the $CO_2/N_2$ prior to $CO_2/N_2$ being sent through the direct turbine.

With reference to FIG. 5, a flowchart 300 is presented which shows operational combinations of the embodiments of this disclosure that (1) harvest, (2) store, in the form of thermal energy and bulk energy (pressure), and (3) dispatch renewable energy, in response to real-time and projected requirements of electricity grids. Operations 201, 202, 203, and 210 are executed above ground (surface-located). Systems 10 and 200 and Operations 204, 205, 206, 207, 208, and 209 are executed in the subsurface. Operation 201 converts thermal energy to electricity. Operation 210 extracts chilled thermal energy for cooling purposes, such as with a power plant to boost its efficiency. Operation 202 temporarily stores produced brine in surface-located reservoirs to allow scheduling the parasitic load of pressurization and injection when power supply exceeds demand. Operation 203 harvests and injects/stores thermal energy from above-ground sources (solar, waste heat, and chilled energy) when it is most advantageous to do so. Operation 206 checks whether a subsurface operation is either multi-fluid (System 10) or single-fluid (System 200); Operation 209 checks whether it is run as either a geothermal, geothermal/STES, or CTES reservoir. Operation 205 checks whether the produced brine is totally or partially sent to separate reservoirs or is either totally or partially sent to power turbines and heat exchangers to generate electricity. For multi-fluid reservoirs, operation 204 checks whether the injection of $CO_2$ and/or $N_2$ injection is steady and/or cyclic. Operation 207 checks whether make-up water from a separate source is injected into either multi-fluid or single-fluid reservoirs. Operation 208 checks whether make-up brine from a separate source is injected into either multi-fluid or single-fluid reservoirs.

At operation 206, if a multi-fluid or single-fluid geothermal, STES or CTES reservoir is being used, then a check may be made at operation 209 to determine if the reservoir is a CTES reservoir, and if so, operation 210 may be performed to extract the CTE.

Chilled Thermal Energy Storage (CTES) Reservoir Systems

The sixth family of embodiments enables diurnal and seasonal chilled thermal energy storage (CTES), using the single-fluid, concentric-ring well design (FIGS. 3 and 4) and the first family of embodiments of this disclosure. Seasonal CTES can utilize the cold of winter or some other source of CTE, such as from liquid $N_2$ generated by an air separation unit (ASU). It can be done by chilling produced brine when it is most advantageous. A possible brine source is that extracted from a geological $CO_2$ storage (GCS) operation for the purpose of pressure management. An example of when conditions are advantageous is at night in the winter when (1) air temperatures are coldest, (2) heat loss by thermal radiation is greatest, and (3) there is excess power on the grid to supply the parasitic load for brine extraction/chilling/reinjection operations. Seasonal CTES can also be achieved by collecting snow and ice removed from roads and highways, which because they sometimes contain de-icing salt may have a saline composition. When CTE is used to chill aircooling-tower air or water for natural gas and geothermal turbines, it can increase power output by up to 20 percent, which improves peak power capacity and is particularly valuable during the summer months when air temperatures are high. A combination of embodiment families 2 and 6 yields Pumped Chilled Hydro Energy Storage (PCHES). In FIG. 4, the outer ring of brine production wells (218a) can also function as brine reinjection wells.

Ideal attributes for CTES reservoir resources are nearly the antithesis of those for typical geothermal resources. Ideal CTES resources are those with cool temperatures; hence, great depths are not required to attain economically viable temperatures. Because CTE is being replenished on an annual basis, CTES reservoirs can be much smaller than the reservoirs required for sedimentary-basin, geothermal-energy systems. Rather than being a possible hindrance, reservoir compartmentalization can be an asset that is more conducive to subsurface storage of pumped hydro energy. Thus, CTES reservoir systems will have much wider geographic resource potential than sedimentary-basin geothermal-energy systems. This approach can be integrated into a base-load fossil energy plant to improve the economic viability of capturing and storing $CO_2$. This approach can also be integrated into renewable geo-energy systems to enhance BES, STE storage, and load-following power-generation capacities.

Additional Embodiments

The first added family of additional embodiments (FIG. 6) adds the option of using air as a supplemental working fluid. The second added family of embodiments (also FIG. 6) specifically calls out the use of the waste heat of gas ($CO_2$, $N_2$, or air) compression as a source of thermal energy to be stored by heating and pressurizing native brine. The third added family of embodiments (FIGS. 7-9) uses a simpler well configuration than the concentric ring well configuration. The simpler configuration uses an injector/producer well pair that can be deployed incrementally in a modular fashion, thereby enabling the progression from a pilot project to a full-scale commercial operation. The fourth added family of embodiments involves the option of deploying multi-fluid geo-energy systems and methods in settings that may include an open cavern, such as may occur in a salt dome.

Figure 6:
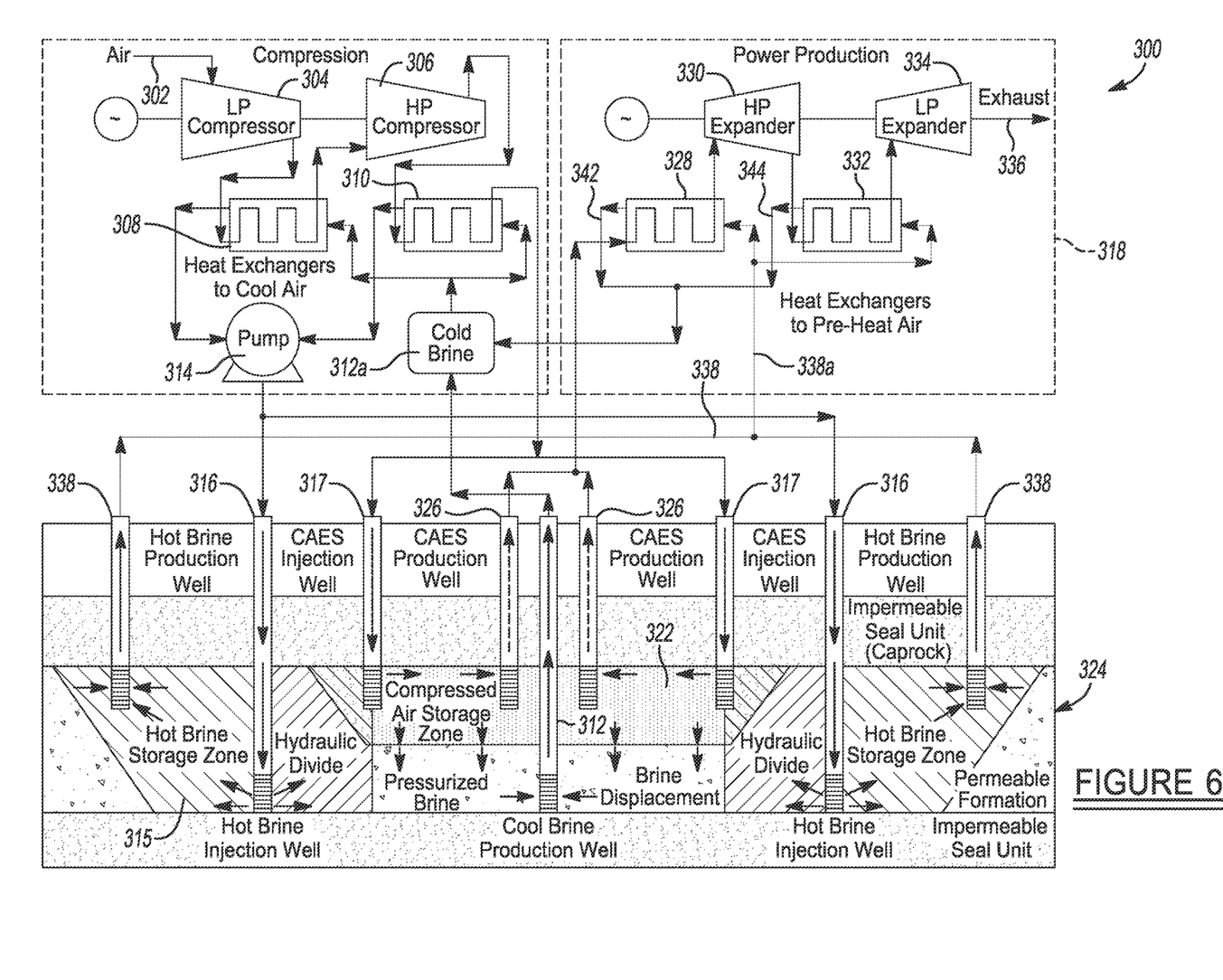
FIG. 6 illustrates another embodiment of the present disclosure which uses a portion of the reservoir formation itself to form a waste heat energy storage reservoir.

Using Air as a Supplemental Working Fluid and Using the Earth as a Compressed Fluid Storage Reservoir Referring to FIG. 6, previously discussed embodiments have involved the use of either $CO_2$ or $N_2$ as a supplemental working fluid to create overpressure within a storage reservoir formation, and to extract thermal energy from the storage reservoir formation. An additional embodiment may involve the use of air, as shown with system 300 in FIG. 6. It will be appreciated that air is similar to $N_2$ in its thermophysical properties. Because it is stored under supercritical conditions, air performs in a similar manner to $N_2$. The use of air also enables the option of using expanders to generate electricity, as is done with conventional compressed air energy storage (CAES). The system 300 of FIG. 6 also provides the option of using waste heat or excess thermal energy from above ground sources, and more particularly using the waste heat of gas compression, which can include the waste heat associated with the compression of $CO_2$, $N_2$, or air. The system 300 takes advantage of the fact that the earth essentially forms an exceedingly large, ready-made storage device or reservoir; therefore, it has sufficient storage capacity to store all of the waste heat of gas compression at a lower cost than above-ground or shallow subsurface storage components, due to the high fabrication costs of such existing storage components. The multi-fluid geothermal energy production system 300 of FIG. 6 may also be thought of as an "Earth Battery", as it uses the storage of waste heat associated with supercritical $CO_2$, $N_2$, or pressurized air to enable utility-scale energy storage needed for increased use of variable renewable energy and low-carbon baseload power. When deployed with $CO_2$, the use of the Earth to function as a storage medium addresses the major deployment barriers to $CO_2$ capture, utilization, and storage (CCUS) by managing overpressure and creating a viable business case for $CO_2$ storage.

The Earth Battery formed using the system 300, together with overpressure driven by $CO_2$, $N_2$, or pressurized air storage, enables the system 300 to harvest, store and dispatch energy from subsurface (geothermal) sources and also from surface-located thermal sources (e.g., solar, fossil, nuclear, or waste heat of gas compression), as well as from excess energy from electric grids. The storage of $CO_2$, $N_2$, or air enables the Earth to function as a low-carbon energy-system hub. Stored, unheated $CO_2$, $N_2$, or air plays three key roles: (1) as a supplemental fluid that creates pressure needed to efficiently recirculate working fluids that store and recover energy, (2) as a working fluid for efficient, low-water-intensity electricity conversion, and (3) as a shock absorber to allow diurnal and seasonal recharge/discharge cycles with minimal pressure oscillations, thereby providing enormous pressure-storage capacity, with reduced risk of induced seismicity or leakage of stored $CO_2$, $N_2$, or air. To keep reservoir pressures in a safe operating range, a portion of the brine produced from the reservoir can be diverted to generate water.

The system 300 of FIG. 6 also takes advantage of the fact that concentric rings of injection and production wells are used to create a hydraulic divide to store pressure, $CO_2$, $N_2$/air, and thermal energy. Such storage can take excess power from the utility power grid and excess thermal energy, and dispatch that energy when it is demanded. The system 300 may be pressurized and/or heated when power supply exceeds demand and depressurized when demand exceeds supply. The Earth Battery implemented by the system 300 is especially well designed for locations where a permeable geologic formation is overlain by an impermeable formation that constrains migration of buoyant $CO_2$, $N_2$/air, and heated brine. The Earth Battery implemented by the system 300 can be deployed in mature oil and gas fields, sometimes called brown fields. It can also be deployed in green fields in saline aquifers where reservoir operations have not yet occurred. The Earth Battery formed by the system 300 can also be deployed in locations where an open cavern exists or where an open cavern can be created, such as in salt domes. Such geologic conditions exist over nearly half of the contiguous United States.

The system 300 shown in FIG. 6 uses an airstream 302 which may be fed through a low pressure (LP) compressor 304, a high pressure (HP) compressor 306, and into a pair of heat exchangers 308 and 310 to cool the compressed air. The two compressors 304 and 306 may also be viewed as forming a compressor section, and more particularly a two stage compressor section. A cold brine holding tank or reservoir 312a fed from a brine pressurized cool brine production well 312 may be used to supply cool brine to the heat exchangers 308 and 310. By "cool brine" it is meant brine that may typically range in temperature from about 100-250 degrees F., versus the "hot brine" described herein, which typically may range in temperature from about 300-600 degrees F.

A pump 314 may be used to pump the brine after it passes through the heat exchangers 308 and 310, and has become heated, into hot brine injection wells 316 where the heated brine resides in a hot brine storage zone 315. Cooled compressed air exiting the second heat exchanger 310 may then be fed back into one or more compressed air energy storage (CAES) wells 317.

The system 300 of FIG. 6 may also include a power production section 318. The HP expander 330 receives heated compressed air (which has been heated by the geothermal reservoir formation) from a compressed air storage zone 322 within a reservoir formation 324. The heated compressed air is withdrawn up through one or more compressed air energy storage (CAES) production wells 326 and routed into a third heat exchanger 328. The third heat exchanger 328 further heats the compressed air to higher temperature (e.g., preferably between about 350 F-600 F) before outputting the heated high pressure air into a first high pressure (HP) expander 330 to help drive a power producing element (e.g. turbine). The air exiting the HP expander 330 may be used to feed a fourth heat exchanger 332 where the airflow is further heated. The airflow leaving the fourth heat exchanger 332 may be fed into a low pressure (LP) expander 334 to help drive a power producing implement (e.g. turbine). A cooled airflow 336 is then exhausted from the LP expander 334. Both of the heat exchangers 328 and 332 may be fed with hot brine 338a from one or more hot brine production wells 338 for the purpose of heating the compressed airflows flowing through the heat exchangers 328 and 332. The hot brine 342 and 344, which has been cooled after exiting each of the heat exchangers 328 and 332, may be directed back into the cold brine holding tank or reservoir 312a. The HP expander 330 and the LP expander 334 cooperatively help to drive a turbine or other power producing implement to produce electric power.

A significant advantage of the system 300 is that the compressed air storage zone 322 forms a storage region within the reservoir formation 324 for waste heat from compressed $CO_2$, $N_2$ or air. This eliminates the need for surface mounted storage tanks or shallow, below-ground storage tanks or equipment. Because the Earth is an excellent thermal insulator with high heat capacity, and because the Earth is naturally warm at the depths where the compressed air storage zone 322 is formed, it eliminates the need to fabricate thermal insulation. Because the Earth heats up around storage zone 322, and because very large quantities of heat are stored within storage zone 322, thermal losses are small, resulting in the recovery of a large fraction of the stored thermal energy.

Figure 7:
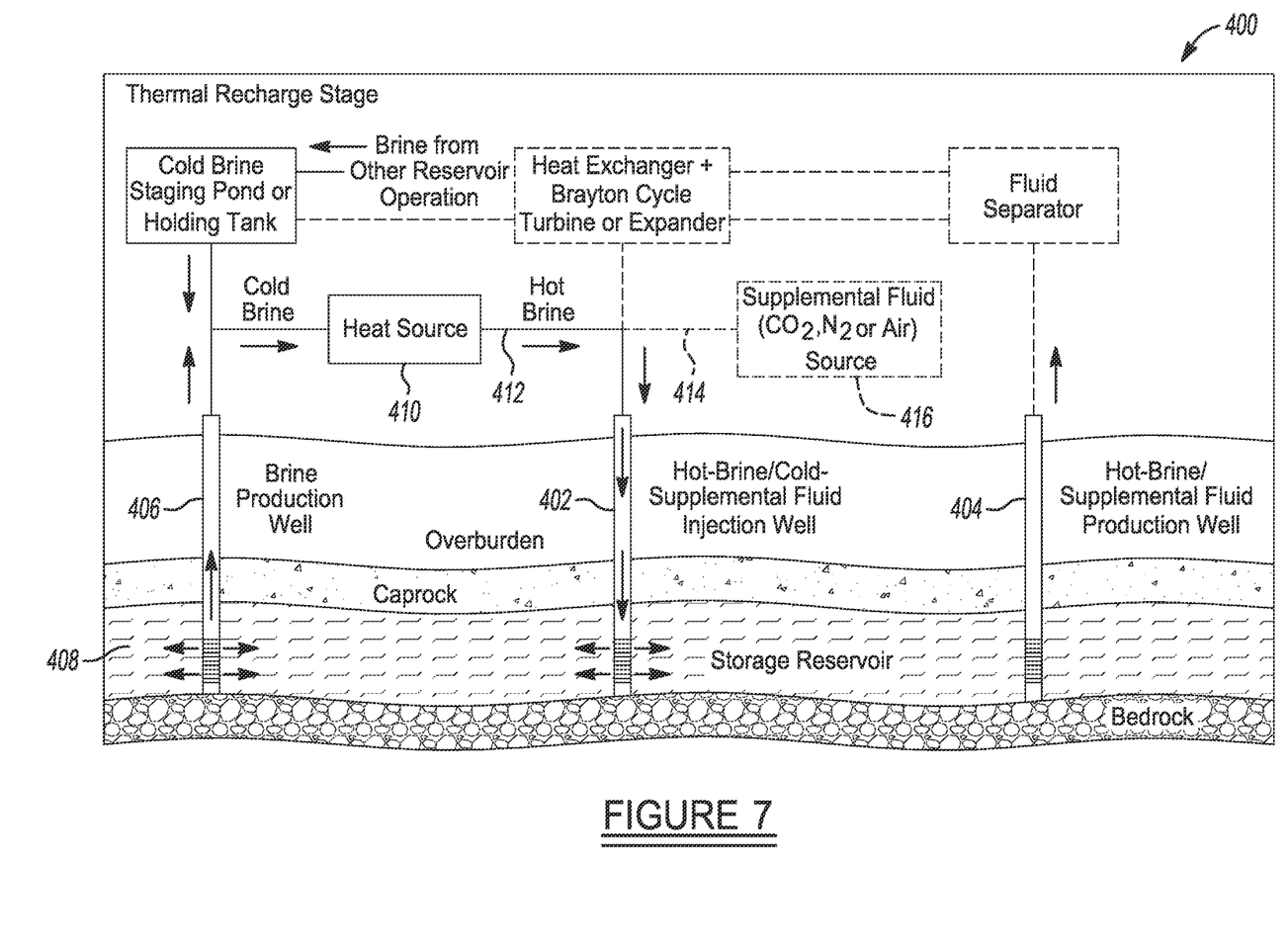
FIG. 7 illustrates a high level diagram of another embodiment of the present disclosure in which only two wells are needed for geothermal energy storage and production, those being a hot brine/cold-supplemental working fluid injection well and a hot brine/supplemental working fluid production well, and also illustrates a first or "thermal recharge stage" of operation.
Figure 8:
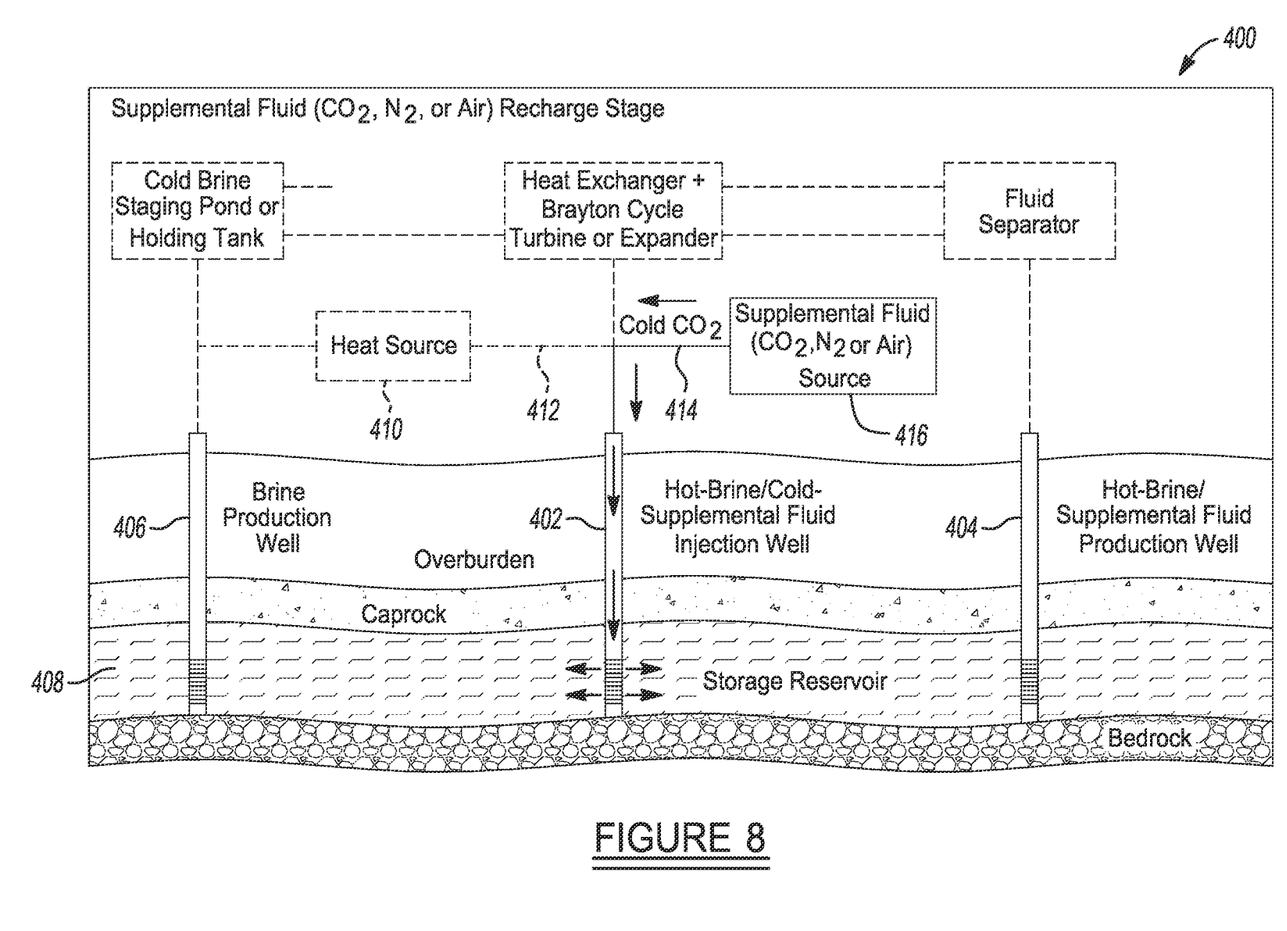
FIG. 8 shows the system of FIG. 7 but with fluid flows indicated which occur during a supplemental fluid recharge stage of operation.

Referring to FIGS. 7 and 8, a system 400 in accordance with another embodiment of the present disclosure is illustrated which forms a well configuration which may be implemented with as few as two wells: an injection well 402 and a production well 404, with the possibility of an additional (i.e., optional) well 406 to extract native brine. If the source of brine is from a separate reservoir operation, this third well will not be required. System 400 may involve three stages: a "thermal recharge stage"; a "supplemental fluid recharge stage"; and an "energy discharge stage".

Referring to FIG. 7, during the thermal recharge stage, hot brine withdrawn from a geothermal storage reservoir 408 through the brine production well 406 is heated from either an above-ground heating source 410 (e.g., a solar thermal farm), or from a deeper reservoir, which is at a higher temperature than the storage reservoir, and then pressurized and injected as pressurized, hot brine 412 through the hot-brine/cold-supplemental fluid injection well 402 into the storage reservoir 408. Heat from the hot brine 412 increases the temperature of the storage reservoir 408, making it behave like a high-grade geothermal resource.

Referring further to FIG. 8, the supplemental fluid ($CO_2$, $N_2$, or air) recharge stage will be described. If $CO_2$ is used, it can originate from either an anthropogenic source (e.g., coal-fired power plant) or a natural geologic source. N2 can originate from an air separation unit (ASU), while air can readily be supplied from the ambient atmosphere. Cold (i.e., unheated) supplemental fluid 414 from a supplemental fluid source 416 is compressed and injected into the storage reservoir 408, using injection well 402, as shown in FIG. 8, which is the same well that was used to inject hot brine, as shown in FIG. 7. The supplemental fluid recharge stage may occur simultaneously with the thermal recharge stage, if hot brine 412 and supplemental fluid 414 are injected into different horizons (i.e., depth intervals) along the injection well. Another option is to operate adjoining injection/production well pairs, where hot brine 412 and cold (i.e., unheated) supplemental fluid 414 injection occurs in an alternating manner to allow continuous $CO_2$ injection, which may be needed to accommodate continuous $CO_2$ supply. For example, during a first step, $CO_2$ may be injected into a first well pair "A", while hot brine is being injected into well pair "B". Then during a second step, hot brine would be injected into well pair "A", while $CO_2$ is being injected into well pair "B".

Figure 9:
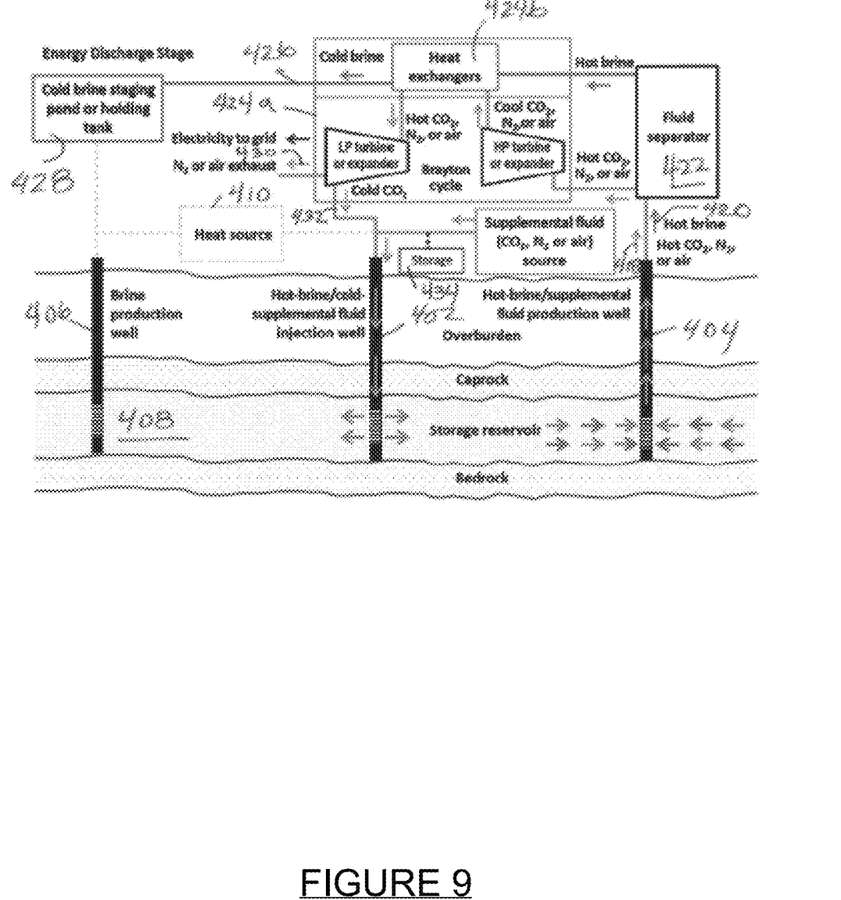
FIG. 9 shows the system of FIG. 7 but with fluid flows indicated which occur during an energy discharge stage of operation.

With reference to FIG. 9, the energy discharge stage will now be described. The energy discharge stage may involve feeding hot supplemental fluid 418, or a mixture of hot supplemental fluid (such as $CO_2$ as shown in FIG. 9) and brine 420, into a fluid separator 422. If the supplemental fluid is $CO_2$ or $N_2$, it can be sent to an electric power producing system 424a such as one or more Brayton cycle turbines or, similarly, if the supplemental fluid is air, it can be sent into one or more expanders (such as shown in FIG. 6). If the supplemental fluid is $CO_2$, $N_2$, or air, it can be sent to one or a series of heat exchangers 424b, where when needed, its temperature can be boosted by the hot brine 420, before being fed into one or more of the turbine or expansion stages of the power producing system 424a (such as shown in FIG. 6). Cold brine 426 may be sent to a cold brine holding tank or staging pond 428. Cold $N_2$ or air 430 can be discharged to the ambient atmosphere. Cold $CO_2$ or $N_2$ 432 can be routed into temporary, above-ground storage 434 or may be immediately pressurized and injected into the storage reservoir 408.

With the various systems discussed herein, the deployment may even be in geologic settings that may include combinations of open caverns and porous sedimentary rock, or even in settings that are entirely comprised of an open cavern.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed:

1. A method for geothermal energy storage using a geothermal reservoir formation, the geothermal reservoir formation including a storage reservoir of brine located below a caprock layer, and above a bedrock layer, the method comprising:

performing a thermal recharge operation by which brine is heated and pressurized to form heated and pressurized brine, and then injected through a hot brine/cold-supplemental working fluid injection well extending through the reservoir formation and into the storage reservoir, the heated and pressurized brine increasing a temperature of the storage reservoir to cause the storage reservoir to act as a geothermal resource;

performing a supplemental working fluid recharge operation during which a supplemental working fluid is compressed and then injected through the hot brine/cold-supplemental working fluid injection well into the storage reservoir, to mix with the heated and pressurized brine, to form a mixture of heated and pressurized brine and heated supplemental working fluid;

performing a first portion of an energy discharge operation in which the mixture of heated and pressurized brine and heated supplemental working fluid is withdrawn from the storage reservoir through a hot brine/hot supplemental working fluid production well in communication with the storage reservoir and fed into a fluid separator, an output of the fluid separator producing separate streams of hot brine and heated supplemental working fluid;

performing a second portion of the energy discharge operation by using a heat exchanger and energy producing subsystem to simultaneously receive the separate streams of hot brine and heated supplemental working fluid and to use the simultaneously received separate streams of hot brine and heated supplemental working fluid for energy production;

after using the simultaneously received separate streams of heated supplemental working fluid and the hot brine for the energy production, discharging cold brine and cold supplemental working fluid from the heat exchanger and energy producing subsystem as byproducts of the energy discharge operation;

then performing at least one of a re-heating operation or a repressurizing operation on either the cold brine or the cold supplemental working fluid to create either a new quantity of hot brine or a new quantity of pressurized supplemental working fluid; and injecting either the new quantity of hot brine or the new quantity of pressurized supplemental working fluid into the storage reservoir, using the hot brine/cold-supplemental working fluid injection well, to further carry out an additional thermal recharge operation or an additional supplemental working fluid recharge operation.

2. The method of claim 1, wherein injection of the heated and pressurized brine and injection of the supplemental working fluid is performed in an alternating manner.

3. The method of claim 1, wherein the separate stream of hot brine output from the fluid separator is fed into at least one heat exchanger used to help perform the energy discharge operation, to further help heat the hot supplemental working fluid during the energy discharge operation.

4. The method of claim 3, further comprising feeding the hot brine which has been cooled by the heat exchanger and energy producing subsystem into a cold brine holding tank or staging pond prior to performing the re-heating operation.

5. The method of claim 1, wherein the output of the fluid separator is heated $CO_2$, and the heated $CO_2$ is fed into the energy producing subsystem used for the energy production.

6. The method of claim 1, wherein performing a supplemental working fluid recharge operation comprises injecting at least one of $CO_2$, $N_2$ or air into the hot brine/cold-supplemental working fluid injection well.

7. The method of claim 1, further comprising a brine production well formed in the reservoir formation for removal of only hot brine.

8. The method of claim 7, further comprising a heat source for further heating the hot brine removed from the brine production well and routing the further heated hot brine into the hot brine/cold-supplemental working fluid injection well.

9. The method of claim 1, wherein injecting the supplemental working fluid comprises injecting at least one of $CO_2$, $N_2$ or compressed air.

* * * * *